Sept. 13, 1927.

W. YOUNG

MOTOR VEHICLE

Filed Feb. 16, 1927

1,642,221

Inventor
By William Young

Patented Sept. 13, 1927.

1,642,221

UNITED STATES PATENT OFFICE.

WILLIAM YOUNG, OF CARLUKE, SCOTLAND.

MOTOR VEHICLE.

Application filed February 16, 1927, Serial No. 168,714, and in Great Britain January 23, 1926.

My invention relates to improvements in and connected with motor vehicles, and has for its object inter alia the direct saving of platfrom area according to length of vehicle, easy accessibility to the working parts for adjustment, while easy detachability of the complete bogie from the main frame or body allows for a very low loading line which makes for safety to passengers and pedestrians, and also allows for considerable variations in size of body, and refers to that class wherein the motive power units are carried on a bogie the main supporting frame for carrying the body of the vehicle.

In carrying out this invention, I provide longitudinal members carrying the road springs. These springs carry the axles above the longitudinal members, which members are connected by cross-members which carry the power and transmission units.

Figure 1:
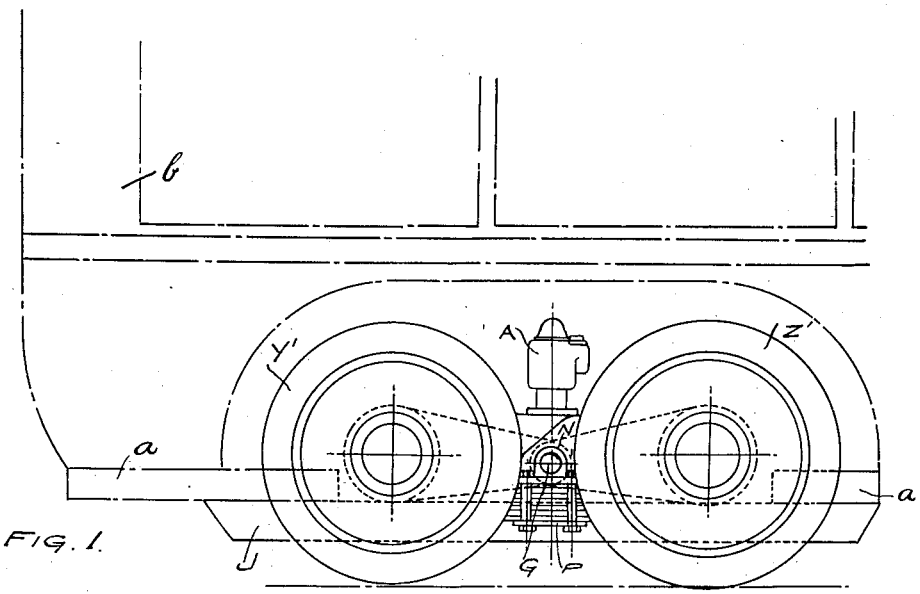

In order that my invention may be properly understood and readily carried into effect, I have hereunto appended one sheet of drawings, of which Figure 1 is a side view of part of vehicle illustrating my invention.

Figure 2:
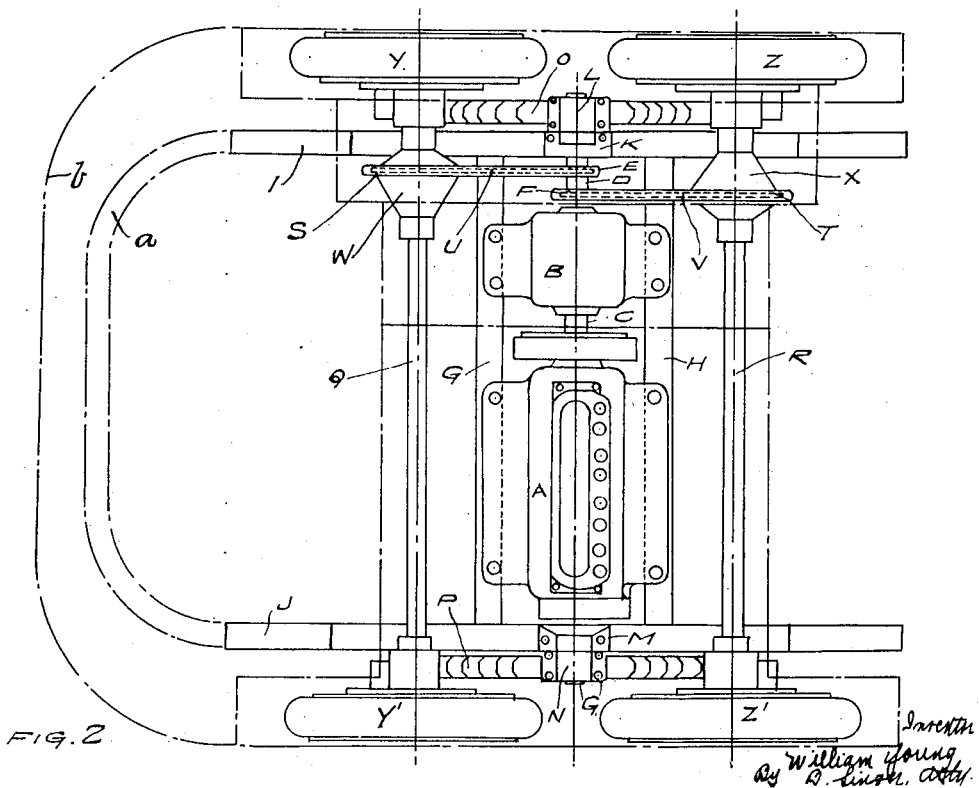

Figure 2 is a plan of Figure 1.

Referring to the drawings, A is the engine, B the change speed gear box and C the engine shaft. D is the driving shaft from gear box on which are mounted two chain sprocket wheels E and F or other suitable drive. The engine A and gear box B are supported between the cross-members G and H, which cross-members G and H are suitably fixed to the longitudinal members I and J, the said longitudinal members I and J being bolted or otherwise connected to the underside of the body frame so that the bogie carrying engine and transmission units could be readily detached from the body frame when required. The driving shaft D is an extension of the gear-box shaft taking the drive and suitably supported. The bearing brackets K and M are fixed to the longitudinal members I and J, and these carry the road springs O and P through swiveling brackets L and N which of course would be modified according to the type of suspension adopted. Q and R are the road wheel axles carrying the bogie, on each axle of which there is mounted a sprocket chain wheel S and T, the driving-chains U and V connecting the sprocket wheels E and F on the driving shaft D, and the wheels S and T on the axles Q and R. W and X are the casings on the axles Q and R containing the differential gears (not shown). Other alternative drives can of course be used. Y, Y', Z, Z' are the road wheels which are carried on the back axles, a is the frame carrying the body of the vehicle, b being the body carried on the frame a. The longitudinal members I and J are suitably detachably attached to the frame a as shown, or may form an integral part thereof.

Claim.

In a motor vehicle having a pair of rear driving axles, a detachable bogie comprising longitudinal members carrying the road springs which in turn carry the axles above the members, the longitudinal members being connected by cross members which carry the power and transmission units.

In witness whereof I affix my signature.

WILLIAM YOUNG.